(12) United States Patent
Ohashi

(10) Patent No.: US 6,173,004 B1
(45) Date of Patent: Jan. 9, 2001

(54) FREQUENCY HOPPING COMMUNICATION DEVICE

(75) Inventor: Tsuyoshi Ohashi, Hashima (JP)

(73) Assignee: Brother Kogyo Kabushiki Kaisha, Nagoya (*) Notice: Under 35 U.S.C. 154(b), the term of this patent shall be extended for 0 days.

(21) Appl. No.: 08/975,968

(22) Filed: Nov. 21, 1997

(30) Foreign Application Priority Data

Nov. 21, 1996 (JP) .................................... 8-310748

(51) Int. Cl.[7] .................. H04K 1/00; H04L 27/30
(52) U.S. Cl. ................ 375/132; 375/136; 375/354
(58) Field of Search ...................... 375/200, 201, 375/202, 206, 316, 354, 132–137; 370/330, 436, 507, 515; 380/34

(56) References Cited

U.S. PATENT DOCUMENTS

| | | |
|---|---|---|
| 4,677,617 * | 6/1987 | O'Connor et al. ............ 370/478 |
| 5,222,098 * | 6/1993 | Yamamoto et al. ............ 375/201 |
| 5,311,542 * | 5/1994 | Eder ............................ 375/200 |
| 5,339,331 * | 8/1994 | Beauchamp et al. ............ 375/137 |
| 5,506,863 * | 4/1996 | Meidan et al. ............... 375/202 |
| 5,625,641 | 4/1997 | Takakusaki ................... 375/202 |
| 5,822,361 * | 10/1998 | Nakamura et al. ............. 375/202 |

FOREIGN PATENT DOCUMENTS 8-191260  7/1996 (JP) .

* cited by examiner

*Primary Examiner*—Stephen Chen
*Assistant Examiner*—Chieh M. Fan
(74) *Attorney, Agent, or Firm*—Oliff & Berridge, PLC

(57) ABSTRACT

Frequency hopping communication devices have a frequency slot switching circuit for sequentially switching the frequency slots used for transmission and reception according to a frequency hopping pattern. The communication devices also include a timing circuit for setting the dwell time for each frequency slot. The timing circuit sets a shorter dwell time during acquisition operations than the dwell time used during tracking. Hence, the receiver can more quickly detect the frequency slot used by the transmitter and acquire synchronization in a shorter time.

21 Claims, 4 Drawing Sheets

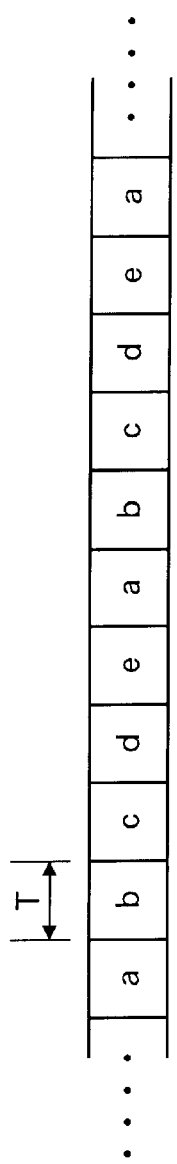
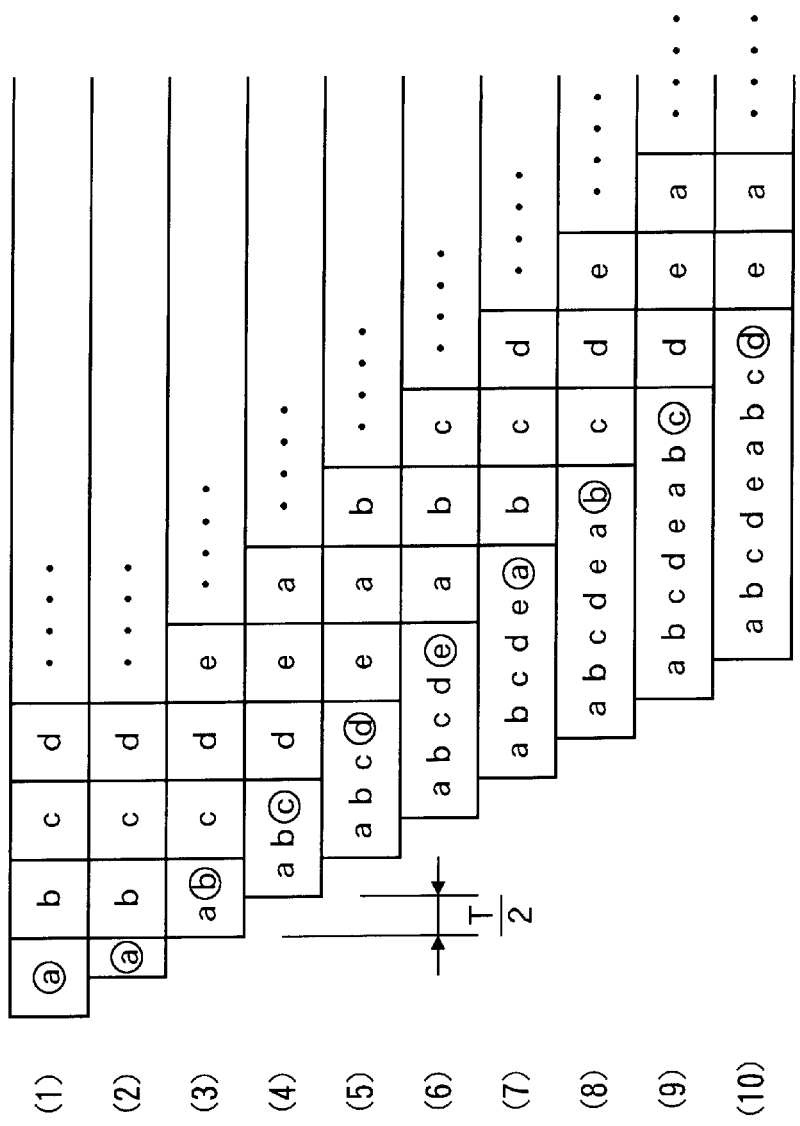
FIG. 4 (a)
TRANSMITTER SIDE FREQ. SLOT
FIG. 4 (b)
RECEIVER SIDE FREQ. SLOT

FREQUENCY HOPPING COMMUNICATION DEVICE

BACKGROUND OF THE INVENTION

1. Field of the Invention

The present invention relates to a frequency hopping communication device for performing spread spectrum communications while hopping between different frequency slots.

2. Description of the Prior Art

Frequency hopping is one method of spread spectrum communication and is well known in the art. In this method of communication, the carrier frequency is changed sequentially at every fixed interval according to a pattern indicating the order of frequency changes. This method is particularly good for handling interference and obstructed frequencies because, even if interference and the like are encountered on one frequency, the communicating device will hop to another frequency at which communication is possible. Further, the method is superior in maintaining privacy. By using a pseudo-random hopping pattern such as Reed-Solomon code, the method makes it difficult for a third party to intercept communication signals.

At the beginning of a communication session, the communicating devices must perform a synchronization acquisition operation to establish the same hopping pattern and synchronize the frequency used between the transmitter and receiver. More specifically, the receiver waits at a specific frequency slot until the transmitter hope to the same frequency slot and the receiver detects reception data transmitted from that transmitter.

However, this necessity for performing a synchronization acquisition operation at the beginning of a communication session in order to synchronize the hopping timing is, in fact, also a shortcoming of the frequency hopping method. If the period of the hopping pattern is relatively long, the receiver might have to wait a long time before the transmitter arrives at the same frequency slot. Hence, the conventional frequency hopping method requires much time to achieve acquisition at the beginning of a communication session.

Japanese Laid-Open Patent Publication (Kokai) No. HEI-8-191260, for example, describes a technology capable of rapidly achieving acquisition using a plurality of frequency synthesizers. However, providing a plurality of frequency synthesizers in the communicating devices also increases the size of the devices.

SUMMARY OF THE INVENTION

In view of the problems described above, it is an object of the present invention to provide a frequency hopping communication device capable of rapidly achieving synchronization acquisition with a like device without increasing the size of the devices.

In order to solve the problems described above, the frequency hopping communication device performs communications with a like device while sequentially changing carrier frequencies according to a frequency hopping pattern. The frequency hopping communication device has a timing device for fixing the dwell time at each frequency at a shorter length during acquisition than during tracking.

Therefore, when attempting to acquire synchronization with a frequency hopping communication device having the construction described above, the timing device in the receiving communication device is set more quickly than during tracking synchronization (communication). As a result, the receiving communication device hops more rapidly than the transmitting communication device, and the receiver quickly detects reception signals.

Since the dwell time of the transmitter is the same as the dwell time used during communication, the receiver can check a plurality of frequency slots during one dwell time interval of the transmitter. In other words, the receiver can check the entire hopping pattern during acquisition operations in a shorter time than one period of the transmitter's hopping pattern.

BRIEF DESCRIPTION OF THE DRAWINGS

The particular features and advantages of the invention as well as other objects will become apparent from the following description taken in connection with the accompanying drawings, in which:

FIG. 3 is example data for a hopping pattern table; and

FIGS. 4(a)–4(b) are diagrams showing the frequency slots hopped to during synchronization acquisition.

DETAILED DESCRIPTION OF THE PREFERRED EMBODIMENT

A frequency hopping communication device according to a preferred embodiment of the present invention will be described while referring to the accompanying drawings.

Figure 1:
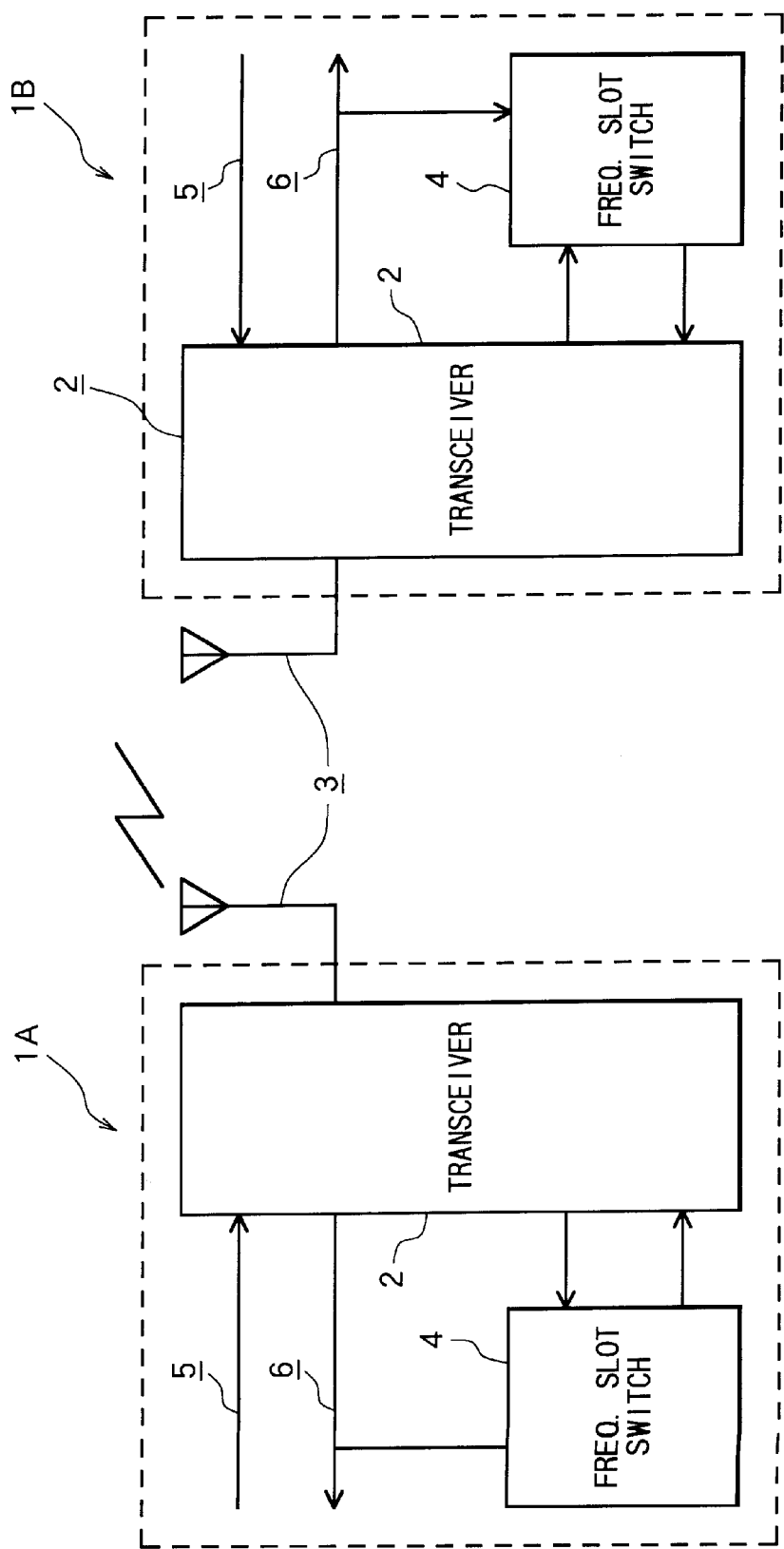
FIG. 1 is a block diagram showing a spread spectrum communication system using frequency hopping communication devices according to an embodiment of the present invention.

FIG. 1 shows a basic diagram of a spread spectrum communication system, which includes two frequency hopping communication devices 1A and 1B according to the preferred embodiment. The two communication devices 1A and 1B have the same configuration. Each device includes a transceiver circuit 2 capable of transmitting and receiving carrier frequencies in many frequency slots; an antenna 3; and a frequency slot switching circuit 4. Each transceiver circuit 2 contains a modulation circuit and a demodulation circuit. Transmission data input to the transceiver 2 through a transmission data transfer path 5 is modulated by the modulation circuit and transmitted via the antenna 3 to the receiving communication device 1B. The receiving communication device 1B receives and demodulates the transmitted data in the demodulation circuit included in the transceiver circuit 2 and outputs the resultant data through a reception data transfer path 6.

Figure 2:
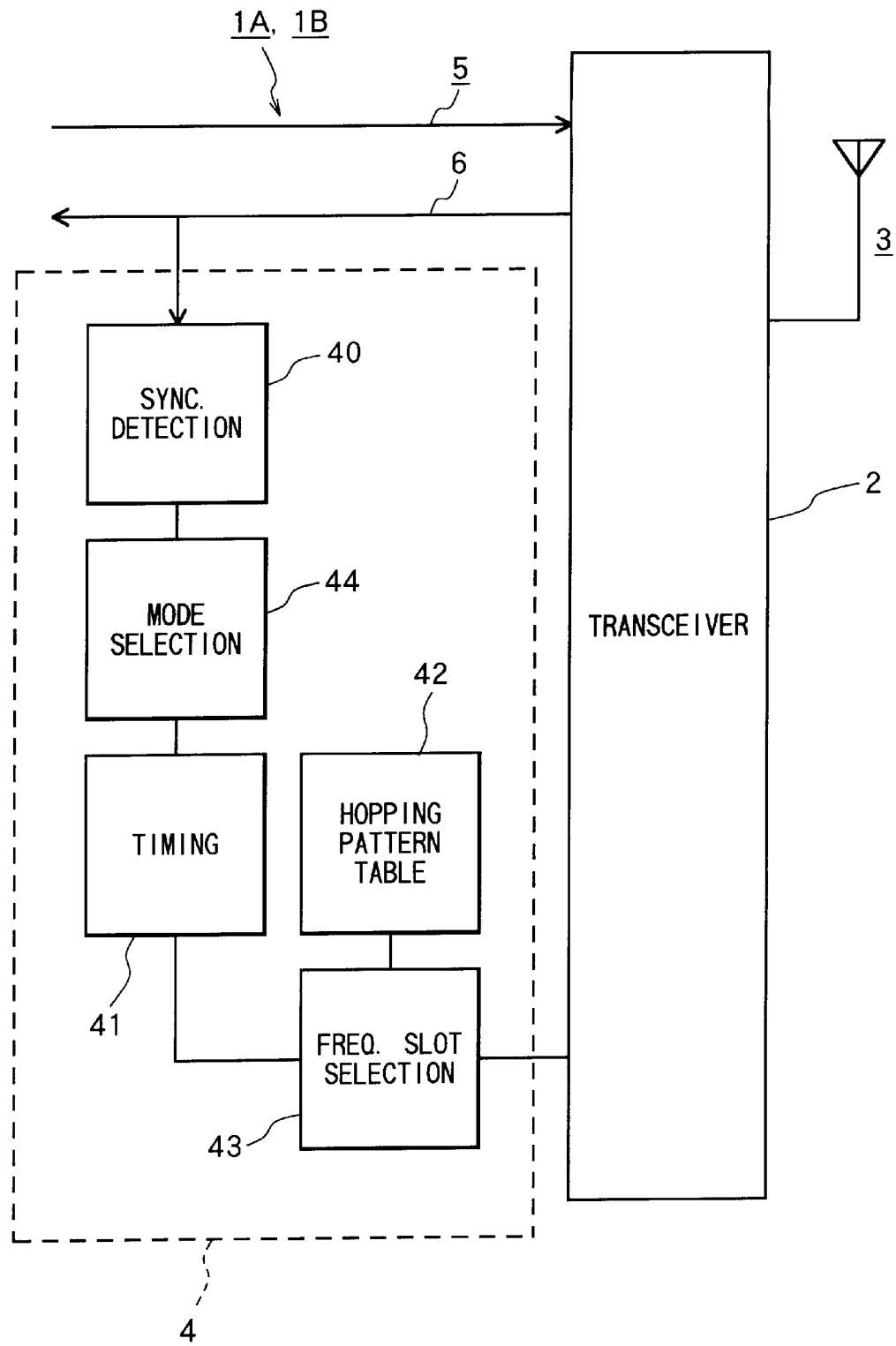
FIG. 2 is a block diagram showing an example of a frequency slot switching unit of FIG. 1.

The frequency slot switching circuit 4 is provided in each communication device to sequentially change the frequency slot being used by the device according to a frequency hopping pattern. The structure of this frequency slot switching circuit 4 is shown in FIG. 2.

Figure 3:
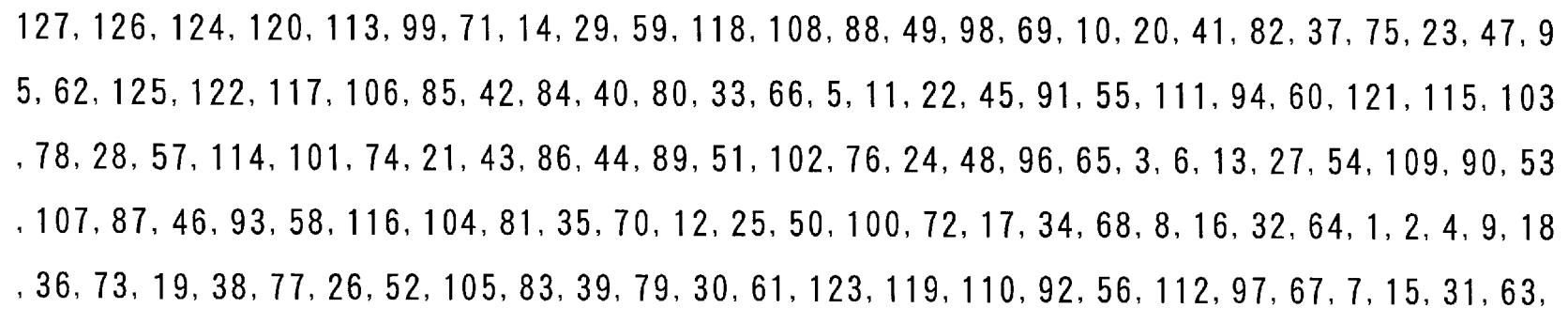

The frequency slot switching circuit 4 includes a synchronization detection circuit 40, a timing circuit 41, a hopping pattern table 42, a frequency slot selection circuit 43, and a mode selection circuit 44. The hopping pattern table 42 is constructed using a memory to store frequency hopping pattern data. This hopping pattern can be generated using Reed-Solomon code, for example, such as that shown in FIG. 3. The frequency slots corresponding to this pattern are divided into groups corresponding to frequency bands used for communication.

At regular intervals, the timing circuit 41 outputs timing signals to the frequency slot selection circuit 43, which, based on these timing signals, selects frequency slots in the order indicated in the hopping pattern table 42 and conveys the frequency slot to be used to the transceiver circuit 2. The mode selection circuit 44 determines whether the frequency hopping communication device 1 will operate in acquisition mode or tracking mode. At the beginning of a communication session, the mode selection circuit 44 selects acquisition mode. When the synchronization detection circuit 40 detects that synchronization has been acquired, the mode selection circuit 44 selects tracking mode. The synchronization detection circuit 40 monitors a reception data transfer path 6. When valid reception data is acquired, the synchronization detection circuit 40 detects that the frequency slots of the transmitter and receiver are the same.

When data is transmitted from the communication device 1A to the communication device 1B, the frequency slot selection circuit 43 of the transmitting communication device 1A sequentially selects frequency slots according to the hopping pattern table 42 and conveys the frequency slots to the transceiver circuit 2. The transceiver circuit 2 transmits data via the antenna 3 using the conveyed frequency slot.

When the transceiver circuit 2 of the receiving communication device 1B receives the data via the antenna 3, the mode selection circuit 44 selects the acquisition mode. Then, the communication device 1B begins operations to acquire synchronization.

The received signal hops among frequency slots represented by a, b, c, d, and e, as shown in FIG. 4(a). The timing circuit 41 outputs timing signals at a period of T/2 during acquisition. This period T/2 is half of the transmitter's dwell time. The dwell time is also preferred to as 1 slot, which is equivalent to the dwell time T during tracking. The receiving communication device 1B performs acquisition operations according to one of the time lines (1) through (10), shown in FIG. 4(b), depending on when the reception operations begin. In other words, when acquisition operations begin, the receiver inspects each frequency slot a, b, c, d, and e in order, changing frequency slots at intervals of half a slot.

In each time line shown in FIG. 4(b), the circled frequency slot signifies the slot at which the transmitter and receiver acquire the same frequency and valid data is obtained by the receiver. At this point, the synchronization detection circuit 40 detects that synchronization has been acquired. The amount of time required to acquire synchronization depends on the starting time of acquisition operations, but the following equation shows that the average time required to acquire synchronization is 2.3 slots.

$$\frac{1+1+2+3+4+5+6+7+8+9}{10\times 2}=2.3$$

In contrast, the equation below shows that the average time required to acquire synchronization when using the conventional method of waiting at a specific frequency slot to receive data is 3.

$$\frac{1+2+3+4+5}{5}=3$$

Hence, the average time required for acquisition using the method of the present invention is 0.7 slots shorter than when using the conventional method.

After synchronization is acquired, the mode selection circuit 44 selects tracking mode, and the timing circuit 41 changes the operating period to T. Accordingly, the dwell time of the transmitter and receiver are the same from this point on, and data communication is possible.

In the embodiment described above, the receiver was set during acquisition operations to hop at intervals half the length of the transmitter's dwell time. However, if the synthesizer circuit (not shown) in the transceiver circuit 2 is capable of locking quickly, this interval can be shortened to less than half, such as one-third the transmitter's dwell time. If this interval is set to one-third, the average time required for acquisition would be even faster, at 1.9 slots.

As described in the embodiment, the frequency hopping communication device of the present invention performs communications with a like device while sequentially changing carrier frequencies according to a frequency hopping pattern. The communication devices include a timing circuit for setting the dwell time at each frequency. The dwell time during synchronization acquisition is set shorter in the receiving device than the dwell time during synchronization tracking. As a result, the frequency hopping communication device can acquire synchronization in a shorter duration of time.

What is claimed is:

1. A frequency hopping communication device that performs communications with a remote frequency hopping communication device, comprising:

a data communicating circuit that is capable of communicating data with a remote frequency hopping communication device; and a frequency slot switching circuit that sequentially changes a frequency slot according to a frequency hopping pattern, said frequency slot switching circuit including a timing circuit that fixes a dwell time at each frequency slot, a hopping pattern table that stores a frequency hopping pattern indicating frequency slots in a predetermined order, and a frequency slot selection circuit that selects the frequency slots in the order indicated in said hopping pattern table, wherein the dwell time during a synchronization acquisition is shorter than the dwell time during a synchronization tracking, the synchronization acquisition being started, when the data communication circuit receives data from the remote frequency hopping communication device, to acquire synchronization of the frequency slot with the remote frequency hopping communication device, the synchronization tracking being performed when communications with the remote frequency hopping communication device are established after the synchronization acquisition, wherein said timing circuit outputs timing signals to said frequency slot selection circuit, and said frequency slot selection circuit selects, based on the timing signals, the frequency slots in the predetermined order both during the synchronization acquisition and during the synchronization tracking.

2. The frequency hopping communication device according to claim 1, wherein said timing circuit outputs the timing signals having different periods during the synchronization acquisition and the synchronization tracking, said frequency slot selection circuit selecting the frequency slots in timed relation with the timing signals.

3. The frequency hopping communication device according to claim 2, wherein the period of the timing signals during the synchronization acquisition is one half the period of the timing signal during the synchronization tracking so that the dwell time during the synchronization acquisition is one half the dwell time during the synchronization tracking.

4. The frequency hopping communication device according to claim 2, wherein the period of the timing signals during the synchronization acquisition is one third the period of the timing signal during the synchronization tracking so that the dwell time during the synchronization acquisition is one third the dwell time during the synchronization tracking.

5. The frequency hopping communication device according to claim 1, wherein the frequency hopping pattern is generated using Reed-Solomon code.

6. The frequency hopping communication device according to claim 1, wherein said frequency slot switching circuit further includes a mode selection circuit that selects either an acquisition mode or a tracking mode, wherein at a beginning of a communication session with the remote frequency hopping communication device, said mode selection circuit selects the acquisition mode.

7. The frequency hopping communication device according to claim 6, wherein said frequency slot switching circuit further includes a synchronization detection circuit that detects whether synchronization has been acquired with the remote frequency hopping communication device, wherein when said synchronization detection circuit detects that synchronization has been acquired, said mode selection circuit selects the tracking mode.

8. The frequency hopping communication device according to claim 1, wherein said frequency slot switching circuit further includes a mode selection circuit that selects either an acquisition mode or a tracking mode, wherein at a beginning of a communication session with the remote frequency hopping communication device, said mode selection circuit selects the acquisition mode.

9. The frequency hopping communication device according to claim 8, wherein said frequency slot switching circuit further includes a synchronization detection circuit that detects whether synchronization has been acquired with the remote frequency hopping communication device, wherein when said synchronization detection circuit detects that synchronization has been acquired, said mode selection circuit selects the tracking mode.

10. A spread spectrum communication system comprising:
   a transmitter including:
      a first transceiver circuit,
      a first input connected to said first transceiver circuit, said first input applying transmission data to said first transceiver circuit,
      a first frequency slot switching circuit that sequentially changes a frequency slot according to a frequency hopping pattern, and
      a first antenna, the transmission data being transmitted by said first transceiver circuit via said first antenna using the frequency slot sequentially changed by said first frequency slot switching circuit; and
   a receiver including:
      a second transceiver circuit,
      a second frequency slot switching circuit that sequentially changes a frequency slot according to the frequency hopping pattern, said second frequency slot switching circuit including a timing circuit that fixes a dwell time at each frequency slot, wherein the dwell time during a synchronization acquisition is shorter than the dwell time during a synchronization tracking, the synchronization acquisition being performed to acquire synchronization of the frequency slot with said transmitter, the synchronization tracking being performed when communications with said transmitter are established after synchronization acquisition, and
      a second antenna, the transmission data being received by said second transceiver circuit via said second antenna using the frequency slot sequentially changed by said second frequency slot switching,
   wherein each of said first frequency slot switching circuit and said second frequency slot switching circuit further includes a hopping pattern table that stores a frequency hopping pattern indicating frequency slots in a predetermined order, and a frequency slot selection circuit that selects the frequency slots in the order indicated in said hopping pattern table, and
   wherein said timing circuit outputs timing signals to said frequency slot selection circuit in said second frequency slot circuit, and said frequency slot selecting circuit switching circuit selects, based on the timing signals, the frequency slots in the predetermined order both during the synchronization acquisition and during the synchronization tracking.

11. The spread spectrum communication system according to claim 10, wherein said timing circuit outputs the timing signals having different periods during the synchronization acquisition and the synchronization tracking, and said frequency slot selection circuit in said second frequency slot selecting circuit selects the frequency slots in timed relation with the timing signals.

12. The spread spectrum communication system according to claim 11, wherein the period of the timing signals during the synchronization acquisition is one half the period of the timing signal during the synchronization tracking so that the dwell time during the synchronization acquisition is one half the dwell time during the synchronization tracking.

13. The spread spectrum communication system according to claim 11, wherein the period of the timing signals during the synchronization acquisition is one third the period of the timing signal during the synchronization tracking so that the dwell time during the synchronization acquisition is one third the dwell time during the synchronization tracking.

14. The spread spectrum communication system according to claim 10, wherein the frequency hopping pattern is generated using Reed-Solomon code.

15. The spread spectrum communication system according to claim 10, wherein said second frequency slot switching circuit further includes a mode selection circuit that selects either an acquisition mode or a tracking mode, wherein at a beginning of a communication session with said transmitter, said mode selection circuit selects the acquisition mode.

16. The spread spectrum communication system according to claim 15, wherein said second frequency slot switching circuit further includes a synchronization detection circuit that detects whether synchronization has been acquired with the remote frequency hopping communication device, wherein when said synchronization detection circuit detects that synchronization has been acquired, said mode selection circuit selects the tracking mode.

17. The spread spectrum communication system according to claim 10, wherein said second frequency slot switching circuit further includes a mode selection circuit that selects either an acquisition mode or a tracking mode, wherein at a beginning of a communication session with said transmitter, said mode selection circuit selects the acquisition mode.

18. The spread spectrum communication system according to claim 17, wherein said second frequency slot switching circuit further includes a synchronization detection circuit that detects whether synchronization has been acquired with the remote frequency hopping communication device, wherein when said synchronization detection circuit detects that synchronization has been acquired, said mode selection circuit selects the tracking mode.

19. A spread spectrum communication system comprising:
- a transmitter including:
  - a first transceiver circuit,
  - a first input connected to said first transceiver circuit, said first input applying transmission data to said first transceiver circuit,
  - a first frequency slot switching circuit that sequentially changes a frequency slot according to a frequency hopping pattern, and said first circuit slot switching circuit including a first timing circuit that sets a dwell time at each frequency to a predetermined period of time, and
  - a first antenna, the transmission data being transmitted by said first transceiver circuit via said first antenna using the frequency slot sequentially changed by said first frequency slot switching circuit; and
- a receiver including:
  - a second transceiver circuit,
  - a second frequency slot switching circuit that sequentially changes a frequency slot according to the frequency hopping pattern, said second frequency slot switching circuit including a second timing circuit that sets a dwell time at each frequency slot so that the dwell time during a synchronization tracking has a period of time equal to the predetermined period of time and so that the dwell time during a synchronization acquisition has a period of time shorter than the predetermined period of time, the synchronization acquisition being performed to acquire synchronization of the frequency slot with said transmitter, the synchronization tracking being performed when communications with said transmitter are established after the synchronization acquisition, and
  - a second antenna, the transmission data being received by said second transceiver circuit via said second antenna using the frequency slot sequentially changed by said second frequency slot switching circuit, wherein each of said first frequency slot switching circuit and said second frequency slot switching circuit further includes a hopping pattern table that stores a frequency hopping pattern indicating frequency slots in a predetermined order, and a frequency slot selection circuit that selects the frequency slots in the order indicated in said hopping pattern table, and wherein each of said first and second timing circuits outputs timing signals to a corresponding frequency slot selection circuit, and said frequency slot selection circuit in said first frequency slot switching circuit selecting, based on the timing signals, the frequency slots in the predetermined order, said frequency slot selection circuit in said second frequency slot switching circuit selecting, based on the timing signals, the frequency slots in the predetermined order both during the synchronization acquisition and during the synchronization tracking.

20. The spread spectrum communication system according to claim 19, wherein said second frequency slot switching circuit further includes a mode selection circuit that selects either an acquisition mode or a tracking mode, wherein at a beginning of a communication session with said transmitter, said mode selection circuit selects the acquisition mode.

21. The spread spectrum communication system according to claim 20, wherein said second frequency slot switching circuit further includes a synchronization detection circuit that detects whether synchronization has been acquired with the remote frequency hopping device, wherein when said synchronization detection circuit detects that synchronization has been acquired, said mode selection circuit selects the tracking mode.

* * * * *